(12) United States Patent
Kikuta et al.

(10) Patent No.: US 8,854,731 B2
(45) Date of Patent: Oct. 7, 2014

(54) CARBON DIOXIDE LASER LIGHT OPTICAL COMPONENT

(75) Inventors: Hisao Kikuta, Sakai (JP); Kenichi Kurisu, Osaka (JP); Keiji Ebata, Osaka (JP)

(73) Assignees: Osaka Prefecture University Public Corporation, Sakai-shi (JP); Sumitomo Electric Industries, Ltd., Osaka-shi (JP); Sumitomo Electric Hardmetal Corp., Itami-shi (JP)

( * ) Notice: Subject to any disclaimer, the term of this patent is extended or adjusted under 35 U.S.C. 154(b) by 264 days.

(21) Appl. No.: 13/090,989

(22) Filed: Apr. 20, 2011

(65) Prior Publication Data

US 2011/0268145 A1 Nov. 3, 2011

(30) Foreign Application Priority Data

Apr. 28, 2010 (JP) ................................ 2010-102840

(51) Int. Cl.
*G02B 5/30* (2006.01)
*G02B 27/28* (2006.01)
*G02B 27/42* (2006.01)
*B23K 26/06* (2014.01)
*G02B 1/11* (2006.01)
*G02B 5/18* (2006.01)

(52) U.S. Cl.
CPC .......... *G02B 5/1809* (2013.01); *G02B 27/4272* (2013.01); *B23K 26/0639* (2013.01); *G02B 27/4261* (2013.01); *G02B 1/115* (2013.01); *G02B 5/1819* (2013.01)
USPC ...................... 359/489.06; 359/352

(58) Field of Classification Search
USPC ...................... 359/493.01–494.01, 350, 352
See application file for complete search history.

(56) References Cited

U.S. PATENT DOCUMENTS

| 6,030,717 | A  | * | 2/2000 | Nakamura et al. | ............ 428/699 |
| 6,943,941 | B2 | * | 9/2005 | Flagello et al. | ............... 359/352 |
| 8,017,923 | B2 | * | 9/2011 | Inoue et al. | ............... 250/504 R |
| 2001/0053023 | A1 | * | 12/2001 | Kameno et al. | ............... 359/486 |
| 2002/0101663 | A1 |   | 8/2002 | Kurisu et al. | |
| 2002/0135847 | A1 |   | 9/2002 | Nagasaka et al. | |

FOREIGN PATENT DOCUMENTS

| JP | 2850683 A | 7/1994 |
| JP | 2005-010377 A | 1/2005 |

OTHER PUBLICATIONS

Guoguo Kang, et al., Achromatic phase retarder applied to MWIR and LWIR dual-band, Optics Express, vol. 18, No. 2, Jan. 14, 2010 pp. 1695-1703.

* cited by examiner

*Primary Examiner* — Derek S Chapel
*Assistant Examiner* — Tamara Y Washington
(74) *Attorney, Agent, or Firm* — Venable LLP; Michael A. Sartori; Tamatane J. Aga

(57) ABSTRACT

At least one surface of a plate member made of ZnSe has a concave-and-convex structure in which a projecting section and a groove section are formed at a spatial cycle equal to or lower than the wavelength of carbon dioxide laser light to thereby provide a substrate body. On a surface of the concave-and-convex structure, an antireflection film is layered that has a lower refractive index than that of ZnSe to carbon dioxide laser light. By this configuration, the polarization state of transmitted carbon dioxide laser light is converted from a linear polarization to a circular polarization or the like.

7 Claims, 15 Drawing Sheets

CARBON DIOXIDE LASER LIGHT OPTICAL COMPONENT

TECHNICAL FIELD

The present invention relates to an optical component. More particularly, the present invention relates to an optical component for carbon dioxide laser, which is useful for converting carbon dioxide laser light to have a polarization state suitable for the processing of an object to be processed.

BACKGROUND ART

Carbon dioxide laser light has been widely used for the processing of an object to be processed because carbon dioxide laser light can easily and stably provide a laser output required for the processing (e.g., cutting) of an object to be processed such as a metal member. Carbon dioxide laser light generated from an oscillator of a carbon dioxide laser processing apparatus is generally linearly polarized. However, when irradiating an object to be processed with this linearly polarized carbon dioxide laser light, a problem in processing quality may occur because a processed width may vary depending on polarization direction of the carbon dioxide laser light.

Then, in a carbon dioxide laser processing apparatus, in order to eliminate the influence of the polarization direction of the carbon dioxide laser light on the processing quality, a circular polarization mirror is provided that is a reflection-type optical component, thereby converting the polarization state of the carbon dioxide laser light from a linear polarization to a circular polarization (see Patent Literature 1, for example).

SUMMARY OF THE INVENTION

Technical Problem

However, in the case of the carbon dioxide laser processing apparatus including the circular polarization mirror, a large space is required for returns of the carbon dioxide laser light, thus causing the apparatus to have a larger size. Furthermore, in the case of such a carbon dioxide laser processing apparatus, the returning optical system is complicated, thus causing difficulty in adjusting the optical axis of the optical system.

The present invention has been made in view of the situation as described above. It is an object of the present invention to provide an optical component that can provide a carbon dioxide laser processing apparatus having a smaller size and that can provide an easy adjustment of the optical axis during use.

Solution to Problem

An optical component of the present invention is an optical component that allows carbon dioxide laser light to transmit therethrough to convert a polarization state of the carbon dioxide laser light. The optical component includes: a substrate body composed of a plate member made of ZnSe, at least one surface of the member having a concave-and-convex structure in which a projecting section and a groove section are arranged at a spatial cycle equal to or lower than the wavelength of the carbon dioxide laser light; and an antireflection film that is layered on a surface of the concave-and-convex structure and that is made of material having a lower refractive index than that of ZnSe to the carbon dioxide laser light.

In the optical component having the above configuration, the substrate body is made of ZnSe that allows carbon dioxide laser light to transmit therethrough. At least one surface of the member has the concave-and-convex structure. On the surface of the concave-and-convex structure, the antireflection film having a lower refractive index than that of ZnSe is layered. Thus, according to the optical component, even a high output carbon dioxide laser light is allowed to transmit therethrough with a high transmittance to thereby convert the polarization state thereof from a linear polarization to a circular polarization or the like.

The configuration as described above does not need to return the carbon dioxide laser light reflected from the circular polarization mirror, for example, which was required in the case where the conventional circular polarization mirror was used. Thus, a space for returning such light is not required and an optical system may have a simple structure.

Thus, the carbon dioxide laser processing apparatus using the optical component of the present invention can provide an apparatus having a smaller size and an easy adjustment of the optical axis.

In the present invention, both surfaces of the substrate body may have concave-and-convex structures that are the same to each other.

Thus, the optical component having this configuration can provide the same phase difference as that of an optical component having the configuration in which only one surface of the substrate body has a concave-and-convex structure, even when the groove depth is adjusted to be a shallower groove depth than that of the optical component in which only one surface of the substrate body has a concave-and-convex structure. The optical component having the configuration as described above can be easily manufactured because the manufacture is allowed to have a shallow groove depth formed by an etching processing.

The optical component of the present invention may include two substrate bodies in which concave-and-convex structures that are the same to each other are formed on the surfaces, and these two substrate bodies may be disposed so as to be opposed to each other with a predetermined space therebetween.

The optical component having such a configuration is allowed to have, as in the above one, a shallow groove depth formed by an etching processing, and can change a phase difference by appropriately adjusting, during use, the relative angle θ formed by the longitudinal direction axes of the groove sections of the respective two substrate bodies, thus easily changing the polarization state of the carbon dioxide laser light.

Furthermore, in the present invention, the substrate body may be a substrate body being composed of a disc-shaped member and being divided into a plurality of fan-shaped regions of which projecting sections and groove sections are formed in such a manner that directions thereof in the respective regions are different from one another, wherein the plurality of fan-shaped regions are arranged so that the directions along which the projecting sections and the groove sections are formed continuously change among fan-shaped regions adjacent to one another.

In the optical component having the configuration as described above, the disc-shaped member may be composed of one base member and the plurality of fan-shaped regions may be formed on the one base member.

The optical component having the configuration as described above can convert the polarization state of the carbon dioxide laser light from a linear polarization to a radial polarization. Laser light having a radial polarization can further improve the processing efficiency than in the case of laser light having a circular polarization.

In the present invention, the projecting section preferably has an inclined side wall inclined with respect to a plane perpendicular to a surface of the member.

The projecting section having an inclined side wall as described above can be easily formed by an etching processing. Thus, the optical component having the configuration as described above can be manufactured more simply.

Advantageous Effects of Invention

The optical component of the present invention can provide a carbon dioxide laser processing apparatus having a smaller size and can provide an easy adjustment of the optical axis during use.

DESCRIPTION OF EMBODIMENTS (Optical Component According to Embodiment 1)

The section below will describe an embodiment of an optical component of the present invention in detail with reference to the attached drawings. In the description below, the optical component of the present invention will be described by an example of an optical element for converting a polarization state of carbon dioxide laser (transmission-type polarization filter). In the following drawings, a concave-and-convex structure formed on the surface of the optical component is illustrated in an exaggerated manner for clear understanding.

FIG. 1A is a perspective view illustrating an optical component according to one embodiment (Embodiment 1) of the present invention. FIG. 1B is a perspective view for explaining a main part showing a concave-and-convex structure in the optical component according to Embodiment 1.

Figure 1:
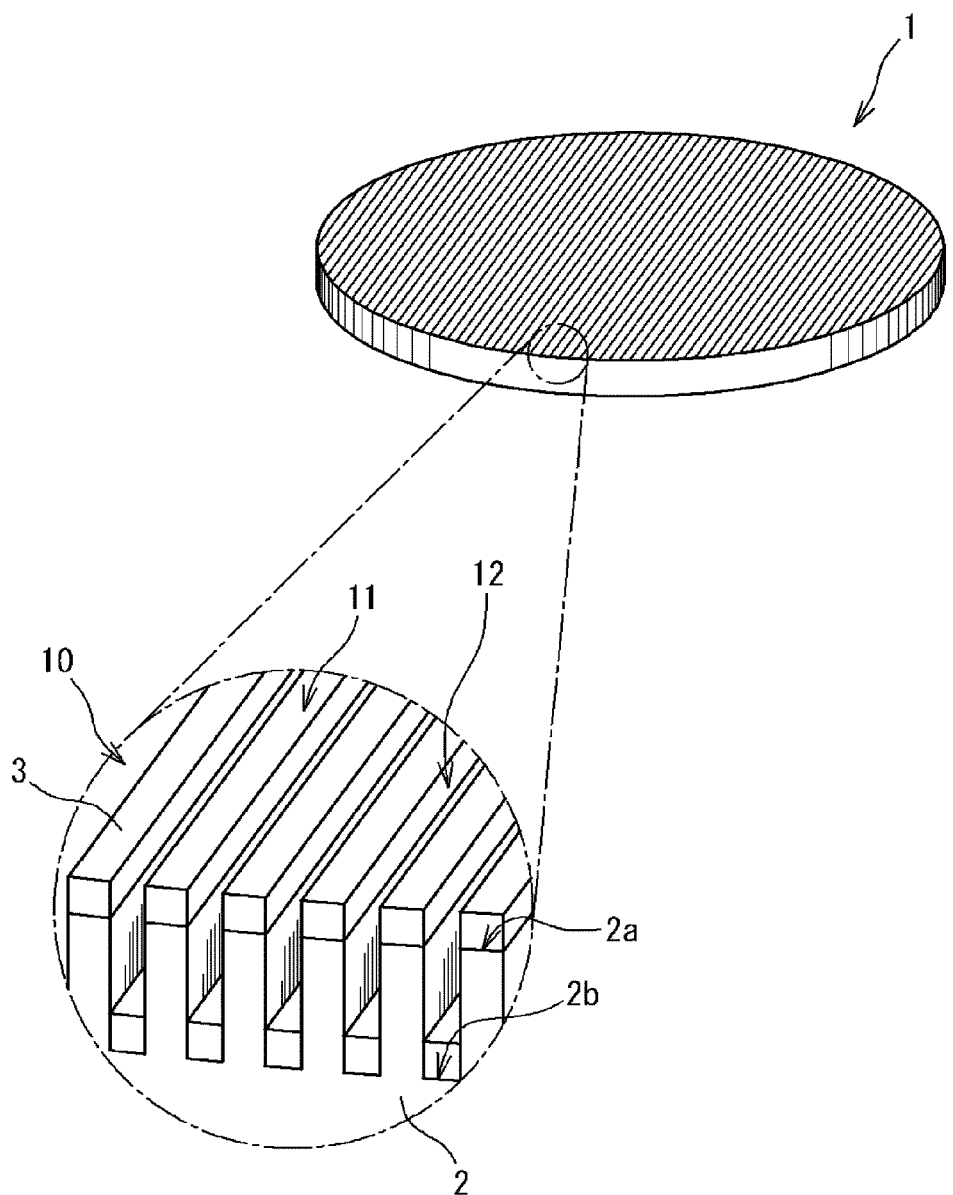
FIG. 1 is a perspective view illustrating an optical component according to one embodiment (Embodiment 1) of the present invention, and a concave-and-convex structure in the optical component according to Embodiment 1.

An optical component 1 shown in FIG. 1 is a transmission-type polarization filter that allows carbon dioxide laser light to transmit therethrough to thereby change the polarization state of the carbon dioxide laser light. This optical component 1 includes: a substrate body 2 that is a disc-shaped member having a concave-and-convex structure 10 on one surface thereof; and an antireflection film 3 layered on a surface of the concave-and-convex structure 10 (see FIG. 1B).

The substrate body 2 is a disc-shaped member made of ZnSe. On the surface of the substrate body 2, the concave-and-convex structure 10 is formed in which projecting sections 11 and groove sections 12 are arranged at a spatial cycle equal to or lower than the wavelength of the carbon dioxide laser light.

The substrate body 2 having the concave-and-convex structure 10 functions as a birefringent material that has different effective refractive indices depending on directions having or without having a spatial cycle. The difference in the effective refractive index as described above causes, for example, a difference in propagation speed between a polarization component incident perpendicularly to the direction of spatial cycle of the concave-and-convex structure 10 and a polarization component incident parallelly to the direction of the groove of the concave-and-convex structure 10, thus resulting in a difference in phase delay between the polarization components. As a result, a phase difference can be caused in the carbon dioxide laser light incident to the optical component 1.

As described above, in the optical component 1 according to Embodiment 1, the substrate body 2 is made of ZnSe, and at least one surface of the member constituting the substrate body 2 has thereon the concave-and-convex structure 10. Thus, even a high output of carbon dioxide laser light can be allowed to transmit through the substrate body 2. Furthermore, the structural birefringence based on the concave-and-convex structure 10 can cause a phase difference in the transmitted carbon dioxide laser light, thus changing the polarization state of the carbon dioxide laser light.

The substrate body 2 has a thickness usually in a range of about 1 to 10 mm at a part having the largest thickness (the projecting section 11). The diameter of the substrate body 2 can be appropriately set depending on a desired application, and can be set to 50 mm, for example. However, the diameter of the substrate body 2 is not particularly limited to this.

Figure 2:
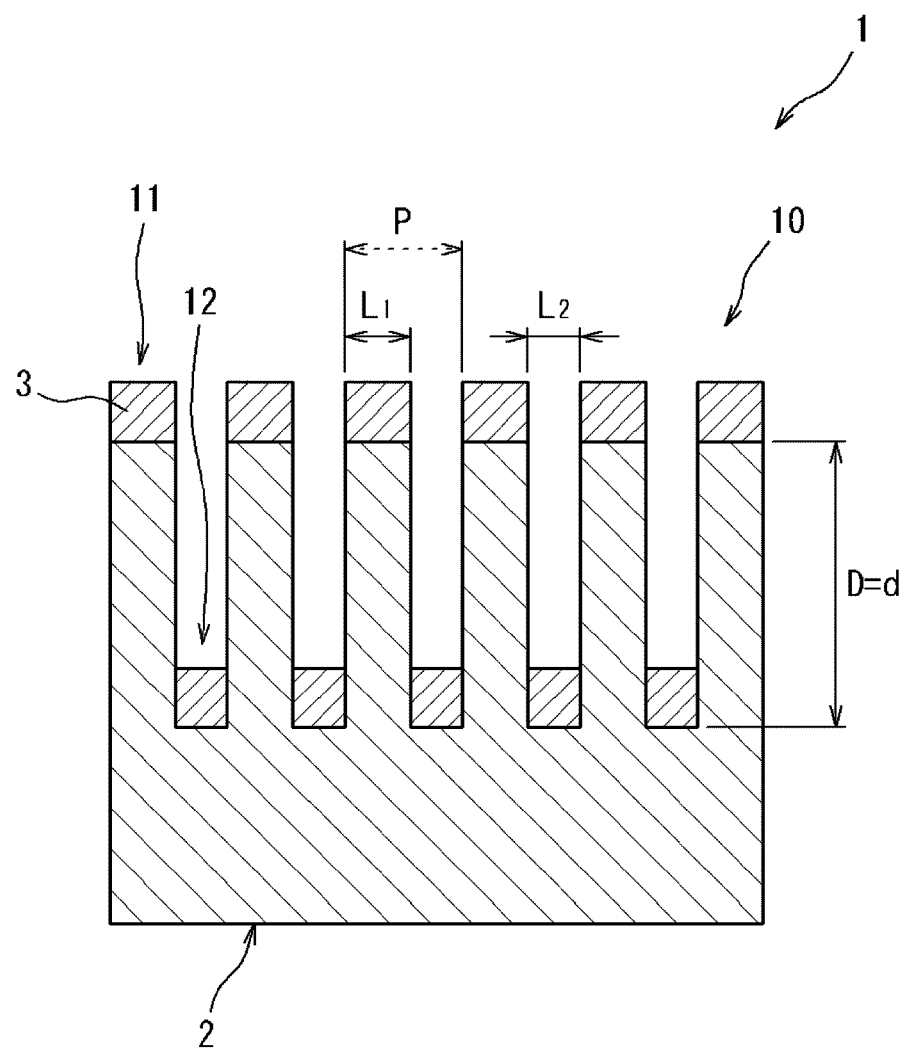
FIG. 2 is a cross-sectional view for explaining the main part showing the concave-and-convex structure in the optical component according to Embodiment 1 of the present invention.

In the optical component 1 according to Embodiment 1, the groove section 12 of the concave-and-convex structure 10 shown in FIG. 2 has a groove depth D that can be set depending on a wavelength and a desired phase difference of carbon dioxide laser light to be used. In the optical component 1 according to Embodiment 1, the difference in phase delay between polarization components is proportional to the depth D. Thus, the value of the depth D may be set depending on the desired phase difference. When the phase difference of 90 degrees is used for the carbon dioxide laser light having a wavelength of 10.6 μm, the depth D is preferably equal to or lower than 5.97 μm to 6.67 μm from the viewpoint of realizing the phase difference within an acceptable error of ±6 degrees.

In the concave-and-convex structure 10, a pitch size (spatial cycle) P, which is the sum of the width $L_1$ of the projecting section 11 and the width $L_2$ of the groove section 12, is set to a short spatial cycle equal to or shorter than the wavelength of the carbon dioxide laser light to be used (9.3 to 10.6 μm). This can consequently suppress occurrence of diffracted light.

The projecting section 11 of the concave-and-convex structure 10 has an aspect ratio (the groove depth D (=the height of the projecting section 11)/the width $L_1$ of the projecting sections 11) that can be set depending on the wavelength of a carbon dioxide laser light to be used and a desired phase difference. When the phase difference of 90 degrees is used for the carbon dioxide laser light having a wavelength of 10.6 μm, the aspect ratio is preferably 2.76 to 2.96 from the viewpoint of realizing the phase difference within an acceptable error of ±6 degrees.

The concave-and-convex structure 10 has a fill factor (the width $L_1$ of the projecting sections 11/pitch size P) is preferably equal to or lower than 0.489 to 0.579 from the viewpoint of realizing the phase difference equal to or lower than 90 degrees ±6 degrees.

The antireflection film 3 is a film made of material that has a lower refractive index than that of ZnSe. The material includes, for example, $YF_3$, $ThF_4$, $YbF_3$, $BaF_2$, $HfF_4$, $AlF_3$, $LaF_3$, $ZrF_4$ or the like.

In the optical component 1 according to Embodiment 1, the antireflection film 3 layered on the surface of the concave-and-convex structure 10 can suppress the reflection of the carbon dioxide laser light incident to the optical component 1, thus improving the transmittance of the carbon dioxide laser light. Thus, the optical component 1 according to Embodiment 1 is preferably used for an application requiring a high output of carbon dioxide laser light.

The optical component 1 according to Embodiment 1 can be manufactured by forming the concave-and-convex structure 10 on the surface of the member constituting the substrate body 2 to further layer the antireflection film 3 on the surface of the concave-and-convex structure 10. The concave-and-convex structure 10 can be formed by subjecting the member constituting the substrate body 2 to, for example, an etching processing or the like. The antireflection film 3 can be layered on the surface of the concave-and-convex structure 10 by, for example, electron beam evaporation, sputtering, ion beam deposition or the like.

(Optical Component According to Embodiment 2)

Figure 3:
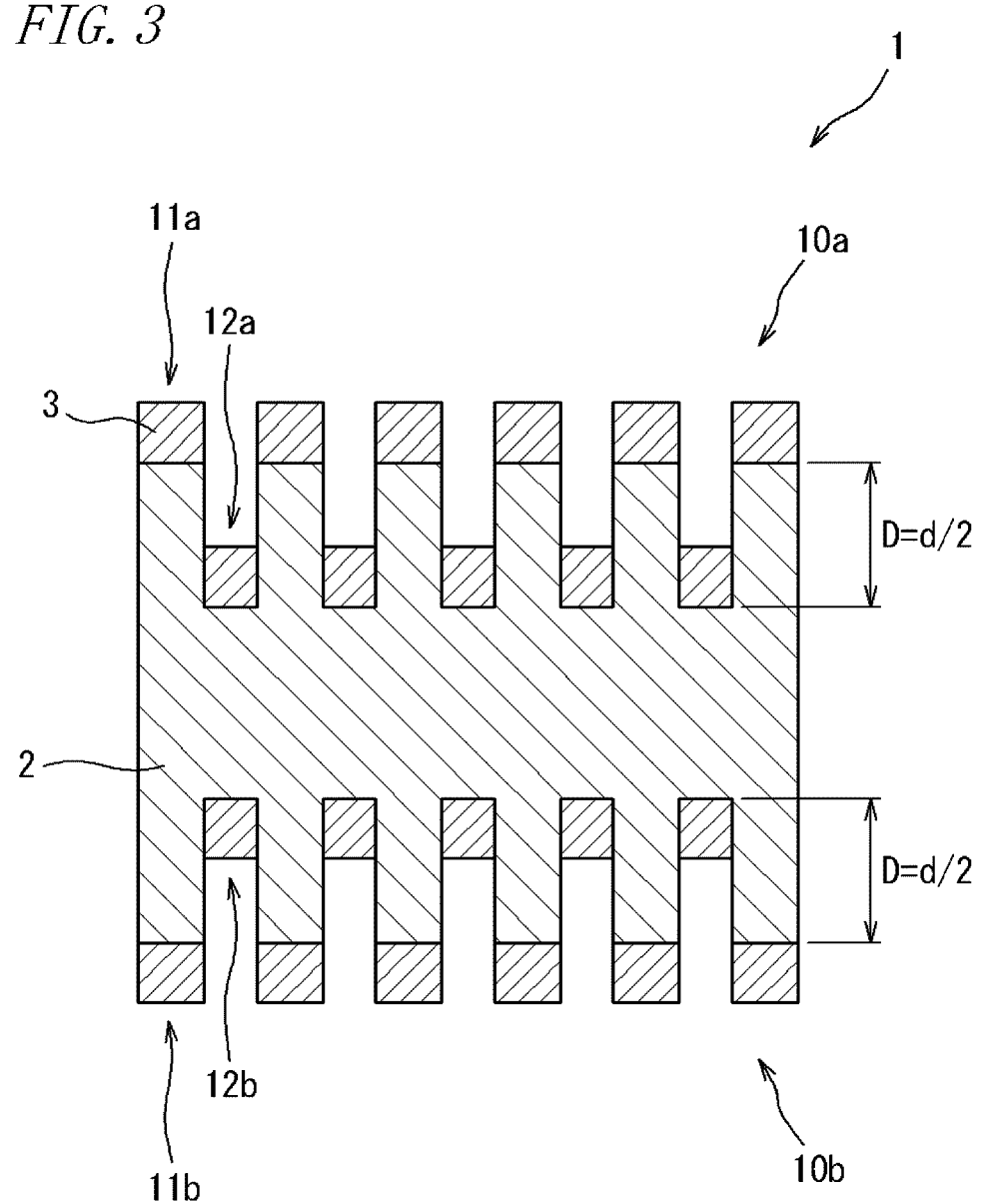
FIG. 3 is a cross-sectional view for explaining a main part showing the concave-and-convex structure in the optical component according to another embodiment (Embodiment 2) of the present invention.

FIG. 3 is a cross-sectional view for explaining a main part showing a concave-and-convex structure in an optical component according to another embodiment (Embodiment 2) of the present invention. The optical component 1 shown in FIG. 3 is different from the optical component 1 according to Embodiment 1 in that both surfaces of a substrate body 2 have the same concave-and-convex structures 10a and 10b.

In the optical component 1 according to Embodiment 2, a difference in phase delay between polarization components of the carbon dioxide laser light is proportional to the depth that is the sum of groove depths of groove sections 12a and 12b of respective two concave-and-convex structures 10a and 10b.

Thus, in order to cause the phase difference that is similar to the one in the case of the optical component 1 according to Embodiment 1 to occur, it is sufficient to form the concave-and-convex structure 10 that has a groove depth of ½ (d/2) as compared with the groove depth D (d) in the optical component 1 according to Embodiment 1.

Therefore, an etching processing or the like during the manufacture of the optical component 1 according to Embodiment 2 can be carried out in an easier manner than an etching processing or the like during the manufacture of the optical component 1 according to Embodiment 1. In addition, the optical component 1 according to Embodiment 2 can be manufactured more simply.

Figure 5:
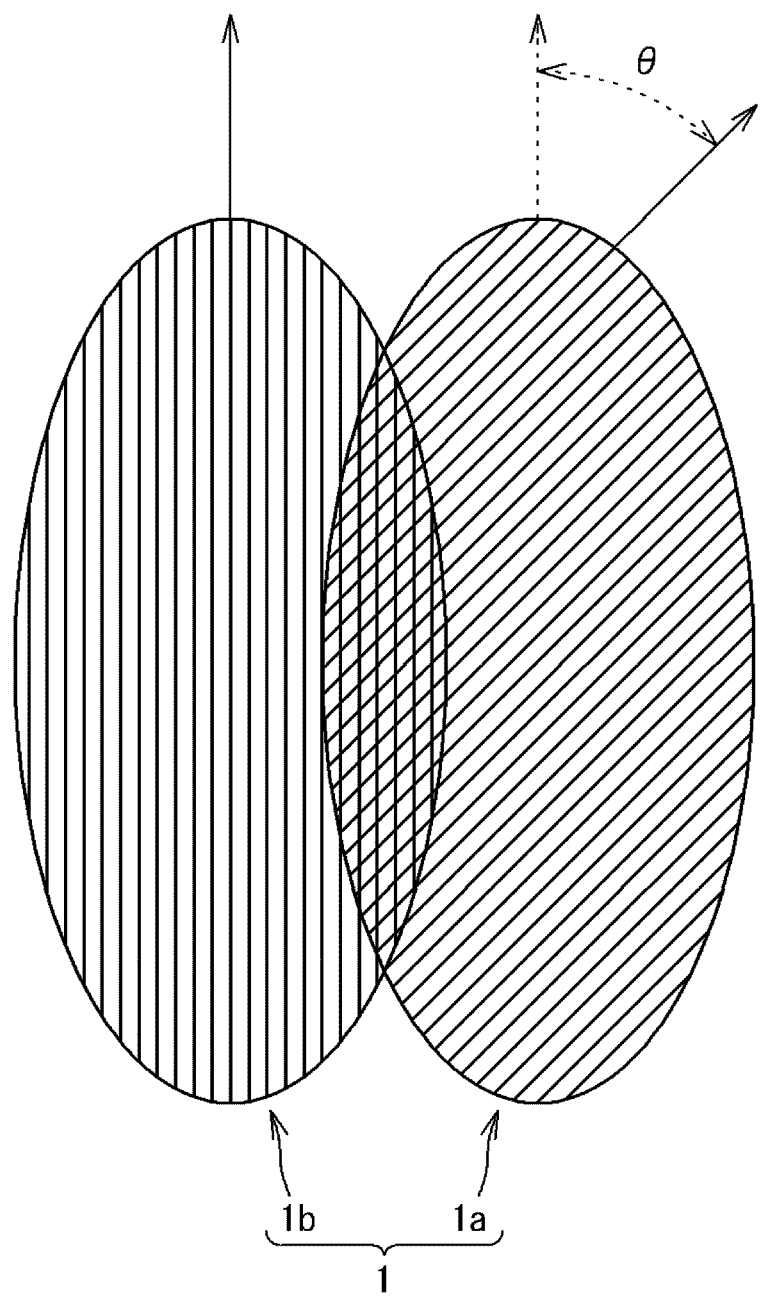
FIG. 5 illustrates a modification of the optical component according to Embodiment 3 of the present invention.

Furthermore, the optical component 1 according to Embodiment 2 can be manufactured so that the angle θ formed by the longitudinal direction axes of the groove sections 12a and 12b of the respective concave-and-convex structures 10a and 10b can be adjusted to form the concave-and-convex structures 10a and 10b in the substrate body 2 to thereby appropriately set a phase difference caused to occur in the carbon dioxide laser light (see FIG. 5).

The optical component 1 according to Embodiment 2 is the same as the optical component 1 according to Embodiment 1 except for the points as described above.

(Optical Component According to Embodiment 3)

Figure 4:
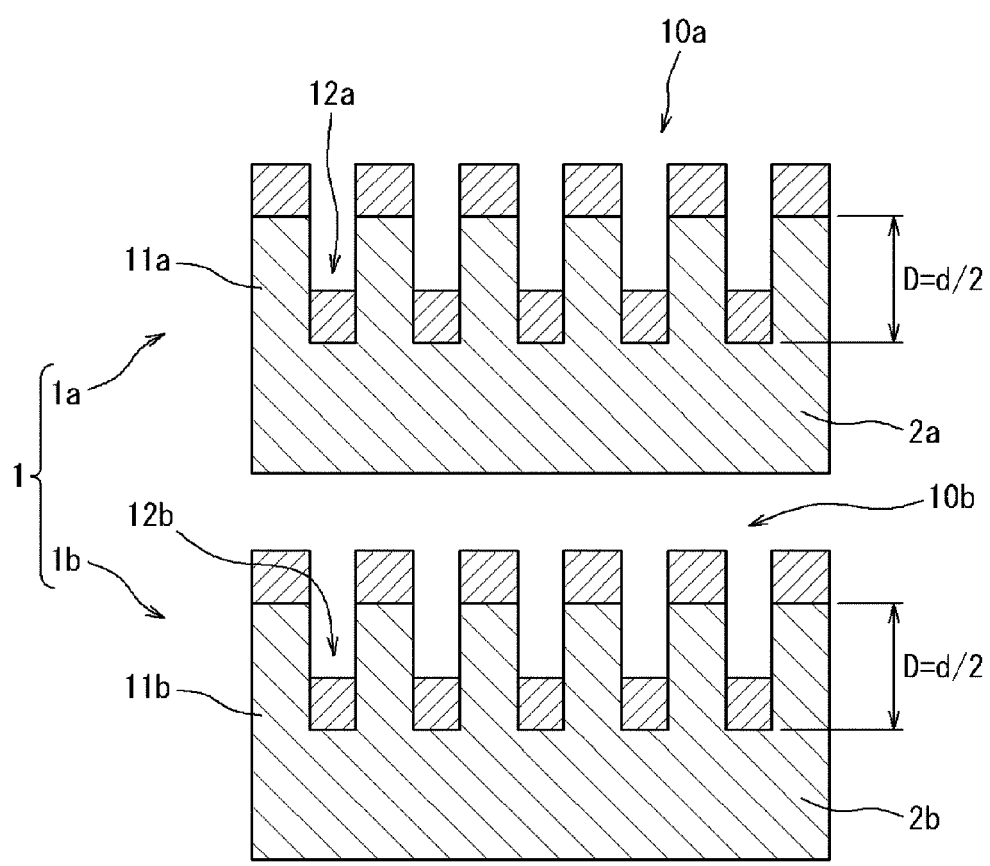
FIG. 4 illustrates an optical component according to a still another embodiment (Embodiment 3) of the present invention.

FIG. 4 illustrates an optical component according to still another embodiment (Embodiment 3) of the present invention. The optical component 1 of Embodiment 3 shown in FIG. 4 is different from the optical component 1 according to Embodiment 1 in that the optical component 1 of Embodiment 3 shown in FIG. 4 includes two substrate bodies 2a and 2b having the same concave-and-convex structures 10a and 10b, respectively.

The optical component 1 according to Embodiment 3 includes: a member 1a having a substrate body 2a including the concave-and-convex structure 10a; and a member 1b having a substrate body 2b including the concave-and-convex structure 10b. In the optical component 1 according to Embodiment 3, the substrate bodies 2a and 2b are disposed so that the surfaces thereof are spaced with a predetermined space therebetween and so that the respective concave-and-convex structures 10a and 10b are directed in the same direction.

Similarly, in the optical component 1 according to Embodiment 3, a difference in phase delay between polarization components of the carbon dioxide laser light is proportional to the depth that is the sum of the groove depths of the respective groove sections 12a and 12b of the two concave-and-convex structures 10a and 10b.

Thus, according to the optical component 1 of Embodiment 3, the groove depths of the respective concave-and-convex structures 10a and 10b are ½ (d/2) of the groove depth D (d) in the optical component 1 according to Embodiment 1.

Thus, a phase difference similar to that in the case of the optical component 1 according to Embodiment 1 can be caused to occur.

Thus, the optical component 1 according to Embodiment 3 can easily be manufactured as the optical component according to Embodiment 2, and can cause a phase difference similar to that in the case of the optical component 1 according to Embodiment 1 to occur.

Furthermore, the optical component 1 according to Embodiment 3 is composed of the members 1a and 1b. Thus, during use, a relative angle θ formed by longitudinal direction axes of the groove sections 12a and 12b of the respective members 1a and 1b can be appropriately adjusted to place both of the members 1a and 1b.

Thus, according to the optical component 1 of Embodiment 3, the phase difference caused to occur in the carbon dioxide laser light can be adjusted easily, and the polarization state of the carbon dioxide laser light can be changed easily (see FIG. 5).

(Modification of Optical Component According to Embodiment 3)

Figure 6:
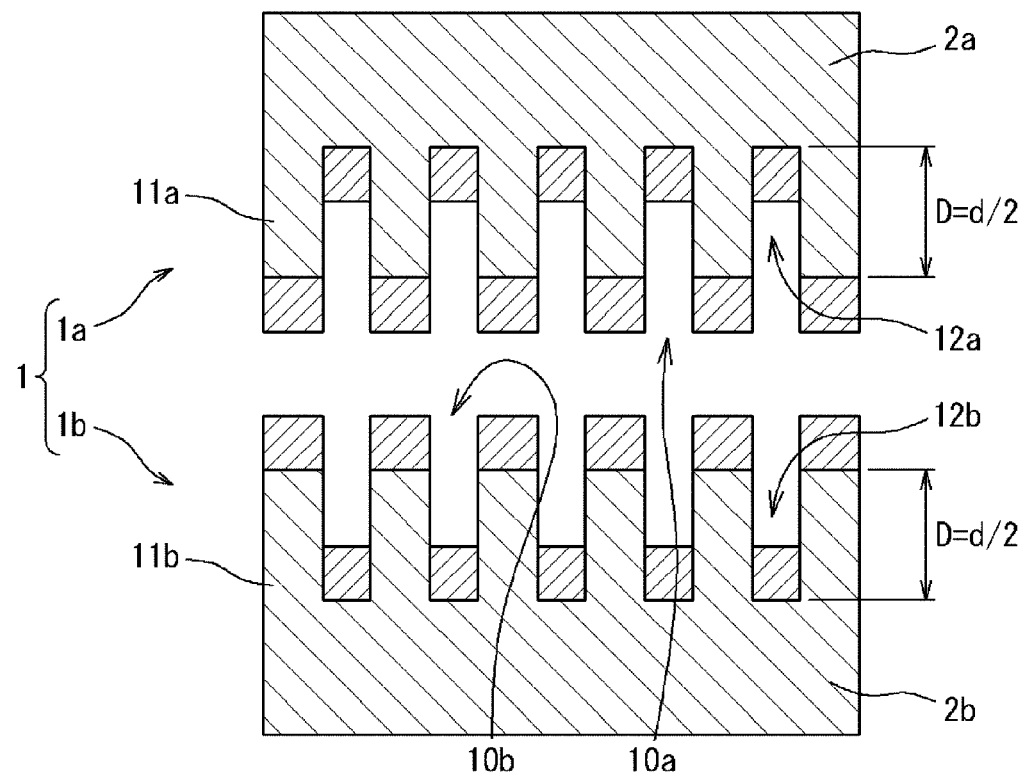
FIG. 6 illustrates another modification of the optical component according to Embodiment 3 of the present invention.

FIG. 6 illustrates a modification of the optical component according to Embodiment 3 of the present invention. The optical component 1 according to this modification is different from the optical component 1 according to Embodiment 3 in that the substrate bodies 2a and 2b are disposed to have a predetermined space therebetween and that the concave-and-convex structures 10a and 10b are disposed so that the surfaces thereof are opposed to each other.

The optical component 1 according to this modification also provides the same effect as the optical component according to Embodiment 3.

(Optical Component According to Embodiment 4)

Figure 7A:
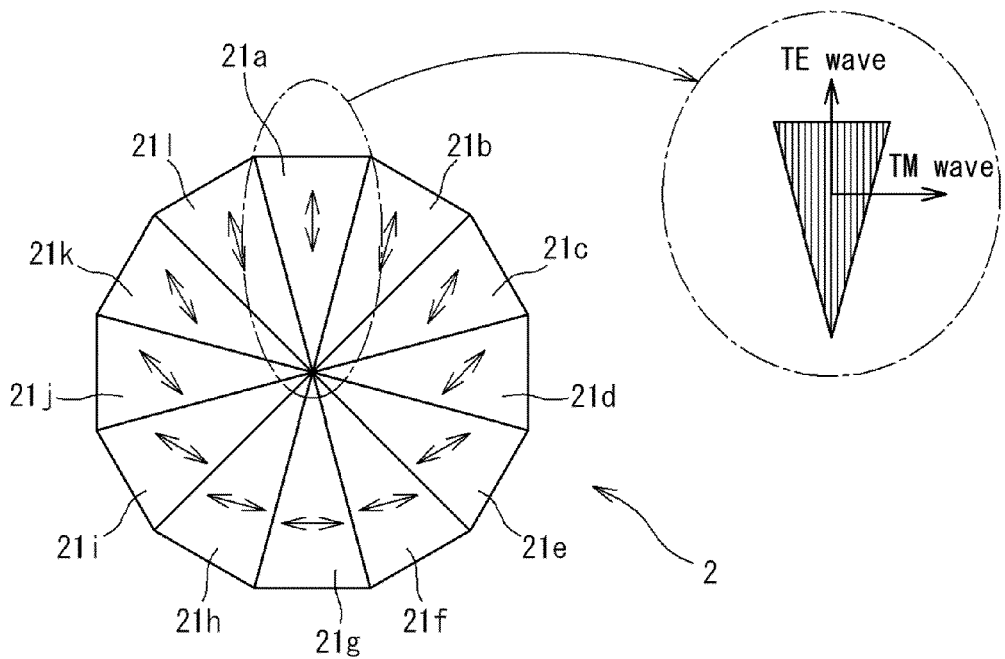
FIG. 7A is a plan view illustrating an optical component according to another embodiment (Embodiment 4) of the present invention.

FIG. 7A is a plan view illustrating an optical component according to another embodiment (Embodiment 4) of the present invention.

In an optical component 1 according to Embodiment 4, a substrate body 2 includes a disc-shaped member composed of one base member.

The substrate body 2 is divided into a plurality of (or twelve) fan-shaped regions 21a to 21l of which projecting sections 11 and groove sections 12 are formed in such a manner that directions thereof in the respective regions are different from one another. The plurality of fan-shaped regions 21a to 21l are arranged so that directions forming the projecting sections 11 and the groove sections 12 continuously change among the fan-shaped regions adjacent to one another. Specifically, the forming direction in the fan-shaped region 21b is slightly inclined toward the left direction compared with the forming direction in the fan-shaped region 21a in FIG. 7A. The forming direction in the fan-shaped region 21c is further inclined toward the left direction compared with the formation direction of the fan-shaped region 21b. In this manner, the inclination is increased sequentially.

Figure 7B:
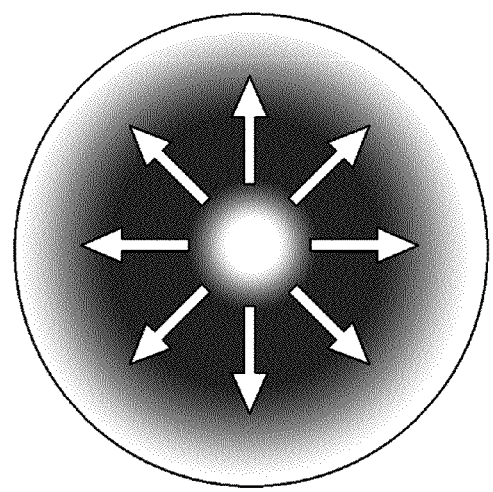
FIG. 7B illustrates a polarization state of laser light transmitted through the optical component according to Embodiment 4.

In the optical component according to Embodiment 4, propagation speeds of the respective polarization components (TE wave and TM wave) can be changed in the concave-and-convex structure 10 of the respective fan-shaped regions. In addition, phase difference can be continuously changed in the concave-and-convex structure 10 of the respective fan-shaped regions along the circumferential direction. Thus, according to the optical component 1 according to Embodiment 4, polarization state of the carbon dioxide laser light can be converted from linear polarization to radial polarization (see FIG. 7B).

With the radially polarized carbon dioxide laser light generated as described above, a stable processing surface can be formed during a processing of an object to be processed by carbon dioxide laser light.

The optical component according to Embodiment 4 is the same as the optical component 1 according to Embodiment 1 except for the points as described above.

The disc-shaped member also may be the one that has the concave-and-convex structure 10 and that is arranged, by adhering a plurality of fan-shaped base members that have projecting sections 11 and groove sections 12 of the concave-and-convex structure 10 having different forming directions from each other so that the forming directions of the projecting sections 11 and the groove sections 12 continuously change along the circumferential direction of the disc-shaped member.

(Other Modifications)

Figure 8:
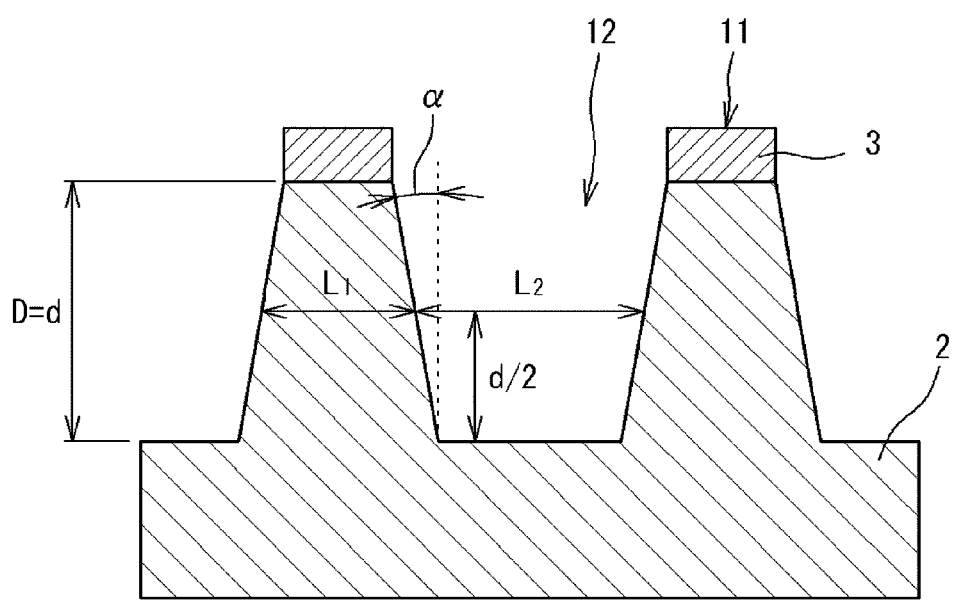
FIG. 8 is a cross-sectional view for explaining a main section showing a concave-and-convex structure formed on the surface of the optical component as a modification of the optical component according to Embodiment 1 of the present invention.

In the optical component 1 for a carbon dioxide laser processing according to Embodiment 1, a side wall of the projecting sections 11 of the concave-and-convex structure 10 may be inclined so that the side wall is inclined with respect to a direction perpendicular to a surface of the plate-like member constituting a substrate body 2 (see FIG. 8).

When the carbon dioxide laser light having a wavelength of 10.6 μm has a phase difference of 90 degrees, the inclined side wall has an inclination angle α that is preferably equal to or lower than 18 degrees from the viewpoint of realizing a phase difference having an acceptable error equal to or lower than ±6 degrees.

In this case, the pitch size P and the aspect ratio can be calculated by using the widths of the projecting sections 11 and the groove sections 12 at the depth of ½(d/2) of the groove depth D (d) in the substrate body 2 as the width $L_1$ of the projecting sections 11 and the width $L_2$ of the groove sections 12.

In Embodiments 2 to 4, a side wall of the projecting section 11 of the concave-and-convex structure 10 may be the same inclined side wall as in this modification.

The projecting section having the inclined side wall as described above can easily be formed by an etching processing or the like, thus simplifying the manufacture of the optical component.

In the present invention, a film made of material having a higher refractive index than that of the material constituting the antireflection film 3 may be further layed on the surface of the antireflection film 3. The film includes, for example, a film made of ZnSe or the like.

(Manufacture Method of the Optical Component)

Next, with reference to the attached drawings, the section below will describe an embodiment of a manufacture method of the optical component of the present invention further in detail. The section below will illustratively describe a manufacture method of the substrate body 2 used for an optical component according to Embodiment 4. FIG. 9A to FIG. 9I illustrate a procedure for the manufacture method of the substrate body used for an optical component according to Embodiment 4 of the present invention. In FIG. 9A to FIG. 9I, in order to simply explain the formation of the concave-and-convex structure, only a part of the concave-and-convex structure is shown in an exaggerated manner.

First, one surface of a substrate 31 made of a transparent body such as ZnSe is coated with a photoresist that is photosensitive to light such as ultraviolet rays. Then, a photoresist layer 32 is formed on the surface of the substrate 31, thereby obtaining a formed and fabricated material 33 (FIG. 9A).

As the photoresist, negative-type photoresist or positive-type photoresist can be used. The positive-type photoresist is preferred from the viewpoint of accurately forming a fan-shaped pattern. Such positive-type photoresist includes, for example, the one having a trade name of AZP4620 made by AZ Clariant or the like.

The photoresist is coated, for example, by spin coating, spraying, dip coating or the like. Among them, the spin coating is preferred because the spin coating can provide an easy control of the thickness. In this spin coating, a spin coater or the like can be used to coat the surface of the substrate 31 with the photoresist by a centrifugal force (e.g., rotation at 4000 rpm for 25 seconds). The thickness of the photoresist layer 32 is not particularly limited, and may be generally in a range from about 0.5 to 5 µm.

Next, the formed and fabricated material 33 after the resist coating is heated (or prebaked) by a heater 41 or the like to evaporate solvent components of the photoresist constituting the photoresist layer 32 to thereby solidify the photoresist layer 32 (FIG. 9B).

A heating temperature can be appropriately set depending on a type of the solvent included in the photoresist or the like. The heating temperature is generally in a range from 80 to 120 degrees C. A heating time can be appropriately set depending on the heating temperature, the type of the solvent included in the photoresist, or the like. The heating time is generally 30 minutes to 1 hour when a bake furnace is used. When the heating (prebaking) is performed in a sealed furnace such as a bake furnace, the heating is preferably carried out under a nitrogen atmosphere in order to avoid a rapid pressure increase due to ignition of the resist.

Next, a mask 34 is closely attached to the surface of the photoresist layer 32 of the formed and fabricated material 33, and thereafter the photoresist layer 32 is exposed through the mask 34 (FIG. 9C).

Figure 10:
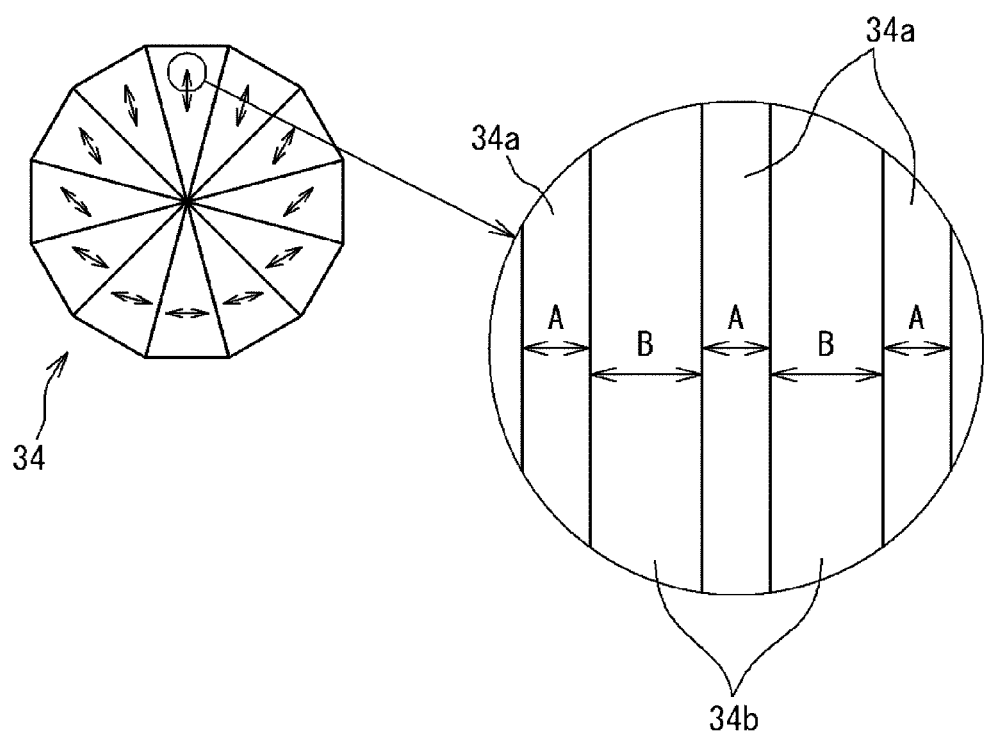
FIG. 10A is a plan view illustrating a mask used in the manufacture method of the optical component according to Embodiment 3 of the present invention.
FIG. 10B is an expanded view for explaining a main part illustrating a surface structure of the mask.

The mask 34 has a plane pattern having a plurality of fan-shaped regions (see FIG. 10A). In FIG. 10A, the arrows show the directions along which projecting sections and groove sections are formed. The mask 34 includes a masking section 34a for shading exposure light and an opening section 34b for transmitting exposure light (see FIG. 10B). In FIG. 10B, a width A of the masking section 34a and a width B of the opening section 34b can be appropriately set depending on a wavelength, a desired phase difference or the like of a carbon dioxide laser light to be used, and can be set to A=1.6 µm and B=2.4 µm, for example.

In the photoresist layer 32 to which the mask 34 is closely attached, as shown in FIG. 9C, a part to which the masking section 34a for shading exposure light is closely attached is not exposed (non-exposed section 32a) and a part through which light is transmitted through the opening sections 34b is exposed (exposed section 32b).

Exposure can be performed, for example, by ultraviolet rays. Such exposure can be performed, for example, by a simple contact exposure carried out by pressing the mask to the photoresist, a vacuum contact exposure carried out by pressing the mask and the photoresist to subsequently decompress the pressed part to thereby increase a degree of contact, or the like. An amount of light irradiated for the exposure can be appropriately set depending on the light to be used, the type or thickness of the photoresist, or the like.

Next, the formed and fabricated material 33 after the exposure is immersed in a developer 36 to perform a development, thereby obtaining a formed and fabricated material 35 (FIG. 9D).

Figure 9:
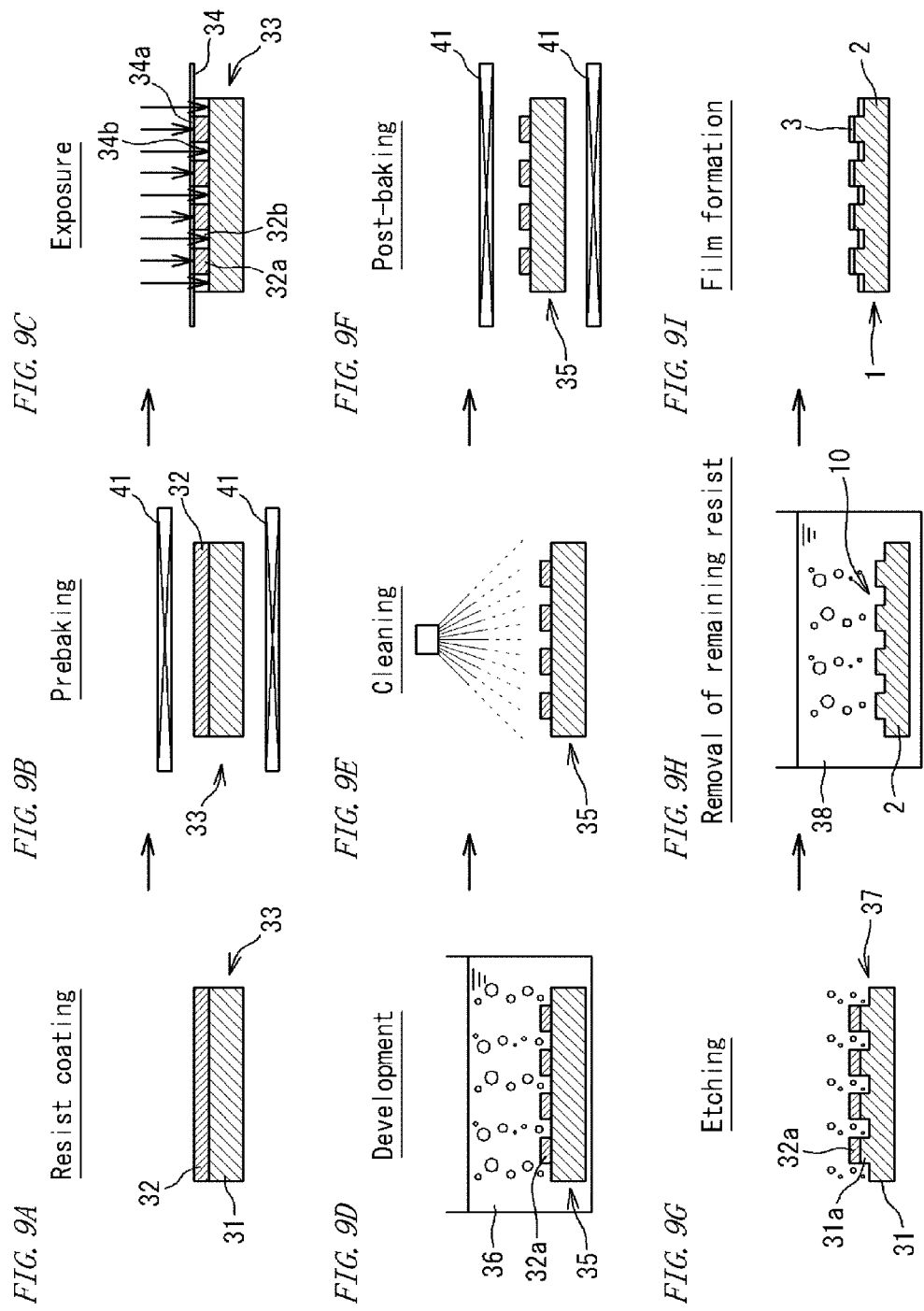
FIG. 9A to FIG. 9I illustrate a procedure for the manufacture method of the optical component according to Embodiment 3 of the present invention.

In this step, when a positive-type photoresist is used as the photoresist, the development causes the non-exposed section 32a to remain and removes the exposed section 32b (FIG. 9D). On the other hand, when a negative-type photoresist is used as the photoresist, the non-exposed section 32a is removed and the exposed section 32b remains (not shown). The following steps shown in FIG. 9 show a case where the photoresist is a positive-type photoresist.

As a developer 36, for example, an alkali developer or the like can be used. Such alkali developer includes, for example, a developer having a trade name of AZ DEVEROPPER made by AZ Clariant or the like.

Development conditions can be appropriately set depending on the types of the photoresist and the developer 36. For example, when a positive-type photoresist (made by AZ Clariant, trade name: AZP4620) is used as the photoresist and an alkali developer (made by AZ Clariant, trade name: AZ DEVEROPPER) is used as the developer 36, the development conditions include, for example, conditions where the formed and fabricated material 35 is caused to oscillate for 240 seconds in the developer 36 retained at a temperature of 23 degrees C.

Next, the formed and fabricated material 35 after the development is cleaned to remove the developer left on the formed and fabricated material 35 (FIG. 9E).

In this cleaning step, for example, ultrapure water having a resistivity of 18.0MΩ or more can be caused to flow on the surface of the formed and fabricated material at a flow rate of 4 L/min for 2 minutes to thereby remove the developer left on the formed and fabricated material 35.

Next, the formed and fabricated material 35 thus cleaned is heated (or post-baked) in a heater 41 to remove water left on the formed and fabricated material 35 (FIG. 9F). Heating conditions such as a heating temperature and a heating time may be ones similar to those for performing the prebaking.

Thereafter, exposed part of the substrate 31 is removed to thereby obtain a formed and fabricated material 37 (FIG. 9G). In such a step, the non-exposed section 32a accurately formed in the previous step functions as a mask. Thus, a pattern can be accurately formed in accordance with the plane pattern.

The exposed part of the substrate 31 can be removed by dry etching, wet etching or the like. Among them, dry etching is preferred because dry etching can correctly remove the exposed part of the substrate 35 to correctly form a minute pattern. When dry etching is performed, the exposed part in the substrate 31 is etched, whereas the non-exposed part of the substrate 31 superposed with the non-exposed section 32a (projecting section 31a) is prevented from being etched because the non-exposed section 32a functions as a mask. Thus, a pattern is formed on the surface of the substrate 31.

Dry etching is preferably RIE from the viewpoints of mass production and the apparatus cost. In particular, inductive coupled plasma-reactive ion etching (ICP-RIE) that can provide highly-anisotropic vertical etching is preferred. In the ICP-RIE, as etching gas, boron trichloride or the like can be used. Etching conditions such as etching gas flow rate, pressure, and etching time vary depending on a type of the etching gas and an etching depth of the exposed part, and thus cannot be determined commonly. For example, when boron trichloride is used as the etching gas, to etch a ZnSe-made substrate so that an etching depth of 6.3 µm is reached, the etching conditions may be, for example, the flow rate of 10 sccm, pressure of 3 Pa, and etching time of 50 minutes.

Next, the non-exposed section 32a left on the substrate 31 is removed to thereby obtain the substrate body 2 having the concave-and-convex structure 10 (FIG. 9H).

The non-exposed section 32a can be removed, for example, by immersing the formed and fabricated material 37 after the etching in a solvent 38 for dissolving the photoresist constituting the non-exposed section 32a. During this, the dissolution of the photoresist is promoted by exposing the formed and fabricated material 37 immersed in the solvent 38 to ultrasonic waves.

The solvent 38 for dissolving the photoresist can be appropriately selected depending on the type of the photoresist. The solvent 38 includes, for example, acetone or the like.

Thereafter, an antireflection film 3 is formed on the concave-and-convex structure 10 of the substrate body 2, to give the optical component 1 (FIG. 9I).

The antireflection film 3 can be formed by layering the antireflection film 3 on the surface of the concave-and-convex structure 10. The antireflection film 3 can be layered on the surface of the concave-and-convex structure 10 by electron beam evaporation, sputtering, or ion beam deposition, for example.

EXAMPLES

The section below will describe the present invention by an Example in further detail. However, the present invention is not limited to Examples.

Test Example 1

Figure 11:
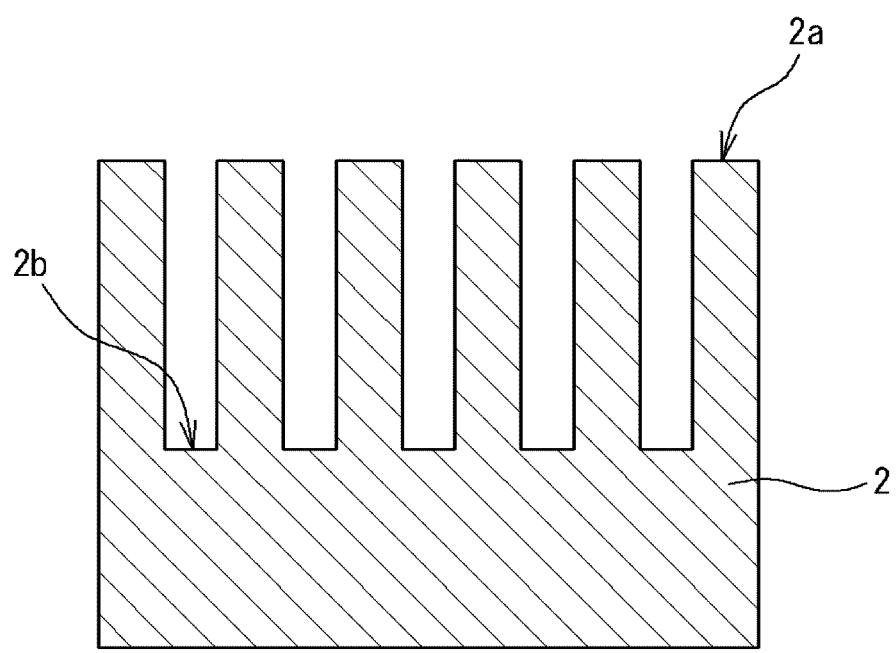
FIG. 11 is a cross-sectional view for explaining a main section showing a concave-and-convex structure in an optical component used in Test Example 1.
Figure 12:
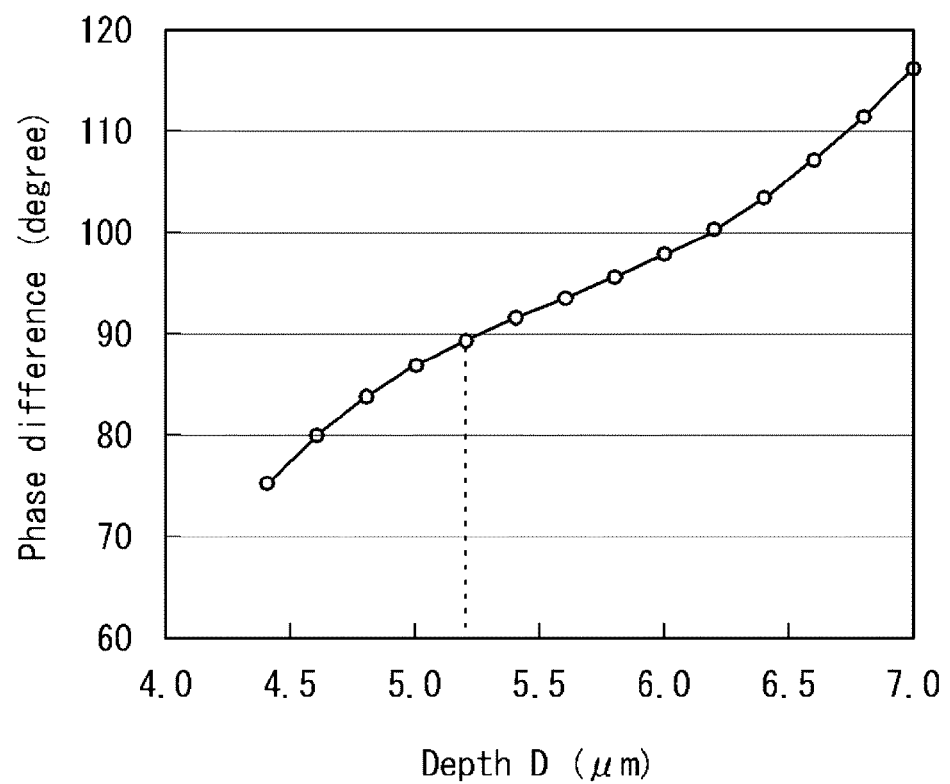
FIG. 12 illustrates a graph showing a result of the investigation in Test Example 1 of a relationship between the groove depth D in the optical component and the phase difference between the respective polarization components of the carbon dioxide laser light.

One surface of a plate member made of ZnSe (diameter of 50 mm, thickness of 5 mm) was subjected to an etching processing so as to have various groove depths, to give a substrate body 2 in which the surface includes a concave-and-convex structure includes projecting sections 2a and groove sections 2b having a rectangular cross section (FIG. 11) was obtained. The projecting sections as described above had a width of 1.6 μm, and the groove sections had a width of 2.4 μm. Carbon dioxide laser light having a wavelength of 10.6 μm was irradiated to the various substrate bodies 2 having different groove depths. Then, measurement was performed on a phase difference between respective polarization components (TE wave and TM wave) of the carbon dioxide laser light having transmitted through the substrate. FIG. 12 shows a relationship between the groove depth D of the optical components and the phase difference between the respective polarization components of the carbon dioxide laser light, in Test Example 1.

From the result shown in FIG. 12, it can be seen that the groove depth D is substantially proportional to the phase difference. In addition, for example, in the case of the concave-and-convex structure in which the projecting section has a width of 1.6 μm and the groove section has a width of 2.4 μm, it can be seen that the groove depth of 5.2 μm can provide the phase difference of 90 degrees between the respective polarization components (TE wave and TM wave) of the transmitted carbon dioxide laser light. Thus, it can be seen that designing the concave-and-convex structure in this manner can provide conversion of the polarization state of the carbon dioxide laser light from a linear polarization to a circular polarization.

As described above, by appropriately setting the groove depth D, a desired phase difference can be provided between the respective polarization components of the carbon dioxide laser light; and thus the conversion of the polarization state of the carbon dioxide laser light is achievable.

Test Example 2

Figure 13:
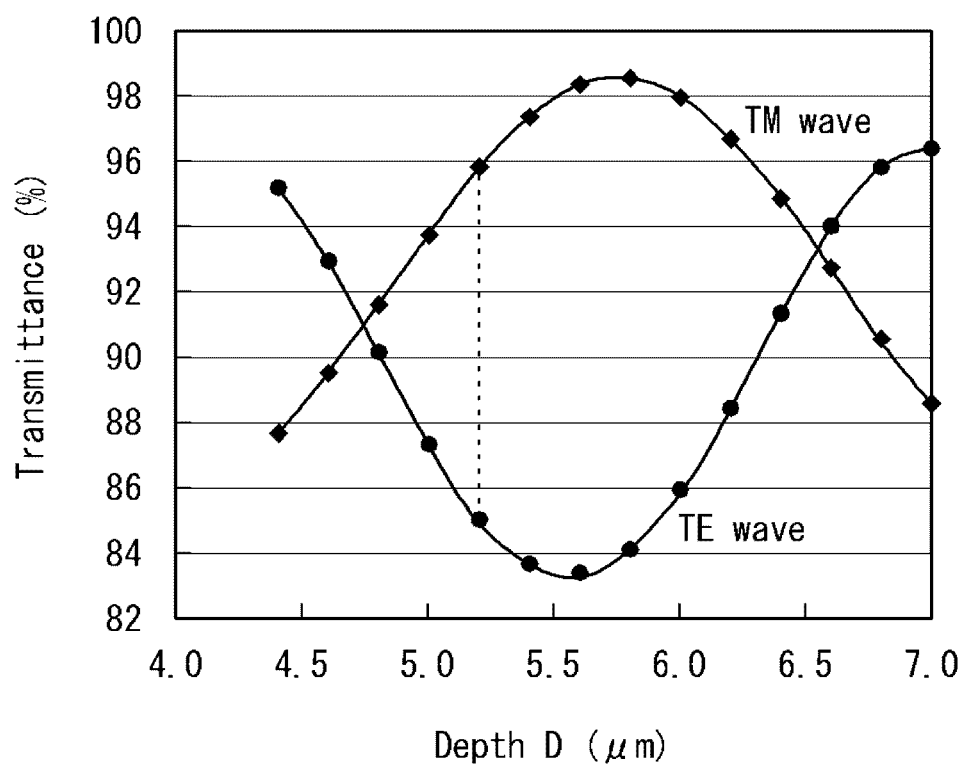
FIG. 13 illustrates a graph showing a result of the investigation in Test Example 2 of a relationship between the groove depth D in the optical component and the transmittances of the respective polarization components of the carbon dioxide laser light.

The respective substrate bodies 2 having various groove depths manufactured in Test Example 1 were used to investigate a relationship between the groove depth D and transmittances of the respective polarization components (TE wave and TM wave) of the carbon dioxide laser light having a wavelength of 10.6 μm. FIG. 13 shows a result of the investigation in Test Example 2 of a relationship between the groove depth D in an optical component and the transmittances of the respective polarization components of the carbon dioxide laser light.

From the result shown in FIG. 13, it can be seen that the respective polarization components (TE wave and TM wave) of the carbon dioxide laser light have different transmittances depending on a size of the groove depth D. For example, when the groove depth is 5.2 μm in the concave-and-convex structure in which the projecting section has a width of 1.6 μm and the groove section has a width of 2.4 μm, the TE wave has a transmittance of 85%, and the TM wave has a transmittance of 96%.

However, the laser processing of the object to be processed preferably obtains a transmittance of 96% or more in order to obtain a high output of carbon dioxide laser light. Thus, the section below will examine a means for obtaining a higher transmittance.

Example 1

One surface of a plate member made of ZnSe (diameter of 50 mm, thickness of 5 mm) was subjected to etching processings of varied conditions so as to have various groove depths, to give a substrate body in which the surface includes a concave-and-convex structure composed of a projecting section of width of 2.144 μm and a groove section of a width of 1.856 μm. Next, a antireflection film made of $YF_3$ having a thickness of 1.77 μm was layered on the surface of the concave-and-convex structure of each substrate body, to give an optical component.

The respective optical components thus obtained was used to investigate a relationship between a groove depth D and transmittances of the respective polarization components (TE wave and TM wave), and a relationship between a groove depth D and a phase difference between the respective polarization components of the carbon dioxide laser light having a wavelength of 10.6 μm. The result is shown in FIG. 14.

Figure 14:
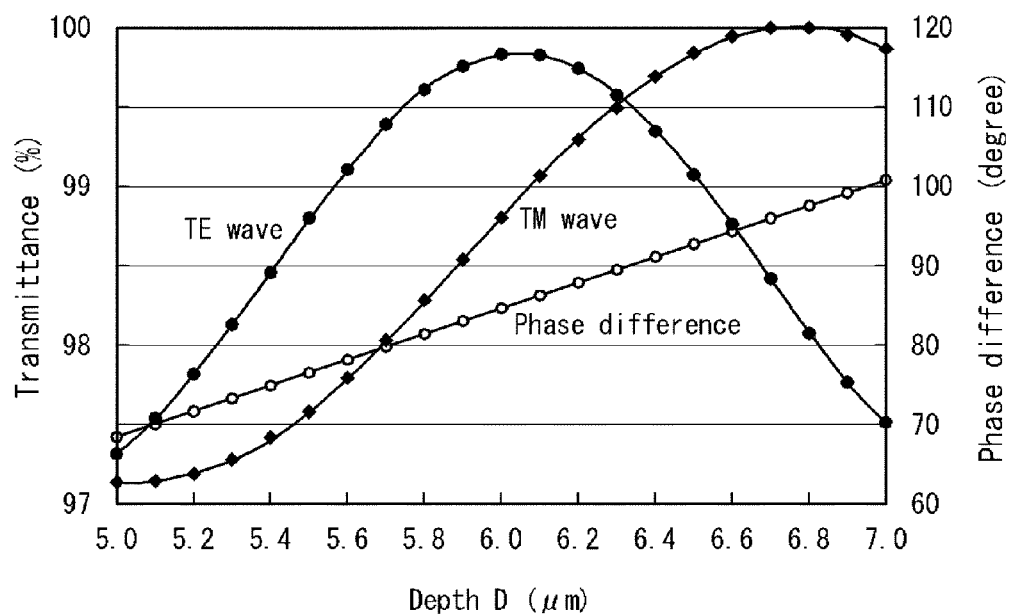
FIG. 14 illustrates a graph showing a result of the investigation in Example 1 of a relationship between the groove depth D in the optical component and the transmittances of the respective polarization components of the carbon dioxide laser light and the phase difference between the respective polarization components.

From the result shown in FIG. 14, it can be seen that when the projecting section has an aspect ratio of 2.33 to 3.26, the respective polarization components (TE wave and TM wave) of the carbon dioxide laser light can have a transmittance of 96% or more, and that the phase difference between the respective polarization components can be adjusted to an arbitrary phase difference within a fixed range. In addition, it can be seen that by the optical component shown in Table 1 below, a high transmittance of 99% or more can be achieved for the respective polarization components of the carbon dioxide laser light, and the phase difference can be adjusted to 90 degrees, thereby converting the linear polarization to a circular polarization.

As described above, an appropriate setting of the aspect ratio allows a phase difference between the respective polarization components of the carbon dioxide laser light to be a desired phase difference, thereby converting the polarization state of the carbon dioxide laser light, and achieves a high transmittance. Therefore, carbon dioxide laser light suitable for the laser processing of the object to be processed can be obtained.

TABLE 1

| | |
|---|---|
| TM wave transmittance (%) | 99.5328 |
| TM wave transmittance (%) | 99.5452 |

TABLE 1-continued

| | |
|---|---|
| Phase difference (degree) | 90.1077 |
| Pitch P (μm) | 4.0 |
| Antireflection film (μm) | 1.77 |
| Height h (μm) | 6.31 |
| Fill factor F | 0.536 |
| Aspect ratio | 2.94 |

As described above, it can be seen that carbon dioxide laser light that is suitable for a laser processing of an object to be processed can be obtained by an optical component obtained by layering an antireflection film on a surface of a concave-and-convex structure of a substrate body made of ZnSe including the concave-and-convex structure.

Test Example 3

One surface of a plate member made of ZnSe (diameter of 50 mm, thickness of 5 mm) was subjected to an etching processing, to give a substrate body including a concave-and-convex structure having various groove depths. The concave-and-convex structure was composed of projecting sections having side walls of an inclination angle α of 0 degree, 10 degrees, or 20 degrees to a direction perpendicular to the surface of the plate-like member, and groove sections. When the inclination angle α was 0 degree, the projecting section had a width of 2.144 μm, and the groove section had a width of 1.856 μm. When the inclination angle α was 10 degrees or 20 degrees, widths of the projecting section and the groove section were assumed to be the widths at a half depth of the groove depth (i.e., 1.6 μm and 2.4 μm, respectively).

Figure 15:
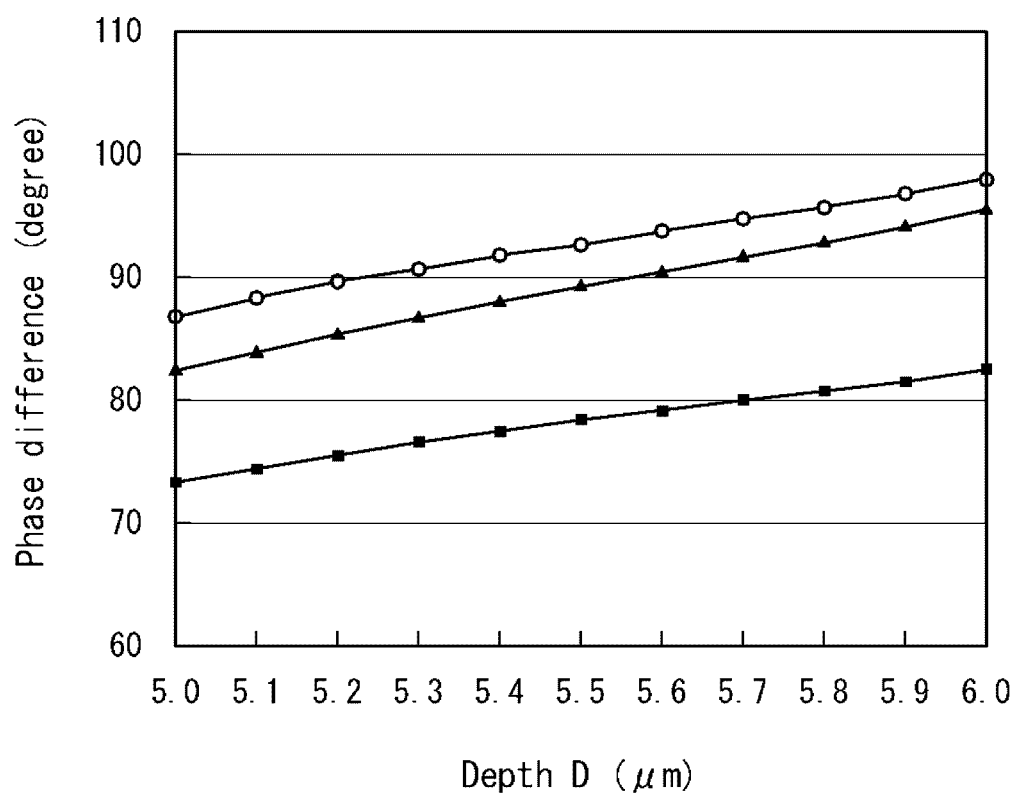
FIG. 15 illustrates a graph showing a result of the investigation in Test Example 3 of a relationship between the inclination angle $\alpha$ of the optical component having thereon the concave-and-convex structure shown in FIG. 8, the groove depth D, and the phase difference.

Carbon dioxide laser light of a wavelength of 10.6 μm was irradiated to the respective substrate bodies thus obtained to thereby measure a phase difference between the respective polarization components (TE wave and TM wave) of the transmitted carbon dioxide laser light. FIG. 15 shows a graph showing a result of a investigation in Test Example 3 of a relationship among the inclination angle α of the side wall of the projecting section of the optical component, the groove depth D, and the phase difference. In FIG. 15, the open circles show the result when the side wall of the projecting section has the inclination angle α of 0 degree. The closed triangles show the result when the side wall of the projecting section has the inclination angle α of 10 degrees. The closed squares show the result when the side wall of the projecting section has the inclination angle α of 20 degrees.

From the result shown in FIG. 15, it can be seen that, for example, when the side wall of the projecting section has the inclination angle α of 10 degrees and the depth D is 5.6 μm, a phase difference between the respective polarization components of the transmitted carbon dioxide laser light can be adjusted to 90 degrees. When the inclination angle α is 20 degrees, a phase difference between the respective polarization components of the transmitted carbon dioxide laser light can be adjusted to 90 degrees by increasing the a depth D to a value higher than that in the case where the inclination angle α is 10 degrees.

As described above, even when a projecting section has an inclined side wall, a phase difference can be controlled as in the case where a projecting section does not have an inclined side wall.

DESCRIPTION OF REFERENCE NUMERALS

1 Optical component
2 Substrate body
3 Antireflection film
10 Concave-and-convex structure
11 Projecting section
12 Groove section
[Citation List]
[Patent Literature]
[Patent Literature 1] Japanese Patent No. 2850683

The invention claimed is:

1. An optical component through which carbon dioxide laser light is allowed to transmit to thereby convert a polarization state of the carbon dioxide laser light, comprising:
   a substrate body composed of a plate member made of ZnSe, at least one surface of the member having a structure in which a projecting section and a groove section are arranged at a spatial cycle equal to or lower than the wavelength of the carbon dioxide laser light; and
   an antireflection film that is layered on a surface of the substrate body composed of a plate member made of ZnSe and the antireflection film is made of a material having a lower refractive index than that of ZnSe, when illuminated with the carbon dioxide laser light.

2. The optical component according to claim 1, wherein both surfaces of the substrate body have structures that are the same to each other.

3. The optical component according to claim 1, wherein the optical component includes two substrate bodies in which structures that are the same to each other are formed on surfaces, the two substrate bodies being disposed so as to be opposed to each other with a predetermined space therebetween.

4. The optical component according to claim 1, wherein the substrate body is composed of a disc-shaped member and is divided into a plurality of fan-shaped regions of which projecting sections and groove sections are formed in such a manner that directions thereof in the respective regions are different from one another, and wherein the plurality of fan-shaped regions are arranged so that the directions along which the projecting sections and groove sections are formed continuously change among fan-shaped regions adjacent to one another.

5. The optical component according to claim 4, wherein the disc-shaped member is composed of one base member, the plurality of fan-shaped regions being formed on the one base member.

6. The optical component according to claim 1, wherein the projecting section has an inclined side wall inclined with respect to a plane perpendicular to a surface of the member.

7. The optical component according to claim 1, wherein the at least one surface of the plate member having the structure and a surface of the optical component opposite the at least one surface of the plate member are not curved.

* * * * *